(12) United States Patent
Nakagomi et al.

(10) Patent No.: US 8,013,913 B2
(45) Date of Patent: Sep. 6, 2011

(54) IMAGE RECORDING METHOD, IMAGE RECORDING DEVICE, AND STORAGE MEDIUM

(75) Inventors: Kouichi Nakagomi, Saitama (JP); Yutaka Onodera, Tokyo (JP); Shinichi Matsui, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 346 days.

(21) Appl. No.: 12/406,529

(22) Filed: Mar. 18, 2009

(65) Prior Publication Data

US 2009/0237529 A1 Sep. 24, 2009

(30) Foreign Application Priority Data

Mar. 19, 2008 (JP) ................................ 2008-072302

(51) Int. Cl.
*H04N 5/76* (2006.01)

(52) U.S. Cl. ..................... 348/231.99; 348/352; 348/155

(58) Field of Classification Search .................. 348/155, 348/169, 208.1, 208.2, 208.14, 352, 356, 348/347
See application file for complete search history.

(56) References Cited

U.S. PATENT DOCUMENTS

| | | | |
|---|---|---|---|
| 7,177,447 B2 * | 2/2007 | Olson et al. | 382/103 |
| 7,796,163 B2 * | 9/2010 | Sugimoto | 348/222.1 |
| 7,925,048 B2 * | 4/2011 | Kinoshita | 382/103 |
| 2007/0263923 A1 * | 11/2007 | Gienko et al. | 382/154 |
| 2008/0037837 A1 * | 2/2008 | Noguchi et al. | 382/118 |

FOREIGN PATENT DOCUMENTS

| JP | 9-70012 A | 3/1997 |
|---|---|---|
| JP | 2001-320623 A | 11/2001 |

* cited by examiner

*Primary Examiner* — Tuan Ho
*Assistant Examiner* — Kent Wang
(74) *Attorney, Agent, or Firm* — Holtz, Holtz, Goodman & Chick, PC

(57) ABSTRACT

An image recording comprising: an initialization step of generating a predetermined number of search points in a specified region of an image, a filtering step of updating coordinates of a plurality of search points, comparing a characteristic value of the specified region with a characteristic value of each of the search points after updated in the image, assigning to the search points weights determined so as to be increased in proportion to a degree of similarity therebetween, screening the search points according to the weights, calculating a variance and a weighted average of the coordinates of the screened search points, and an image recording determination step of determining, based on the variance and weighted average of the coordinates of the screened search points, and the tracking range, whether or not to record the image, and recording the image if it is determined to record the image.

20 Claims, 14 Drawing Sheets

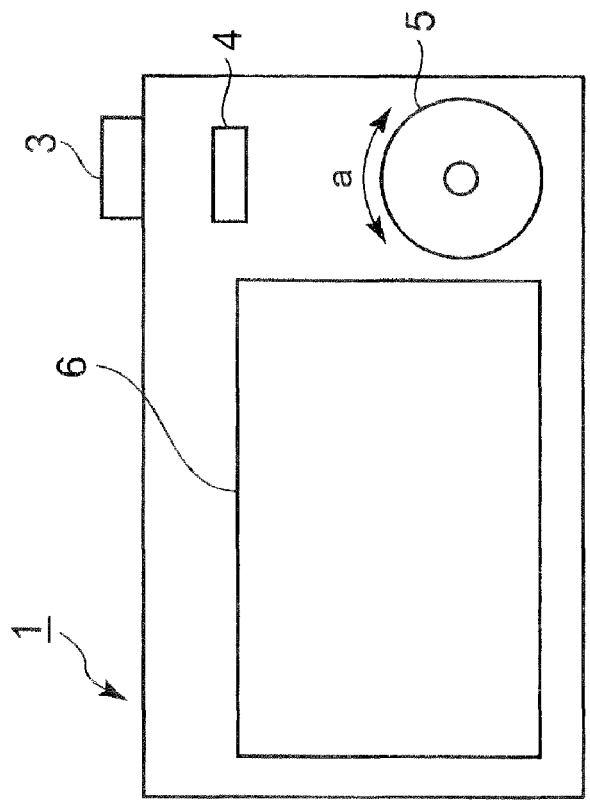
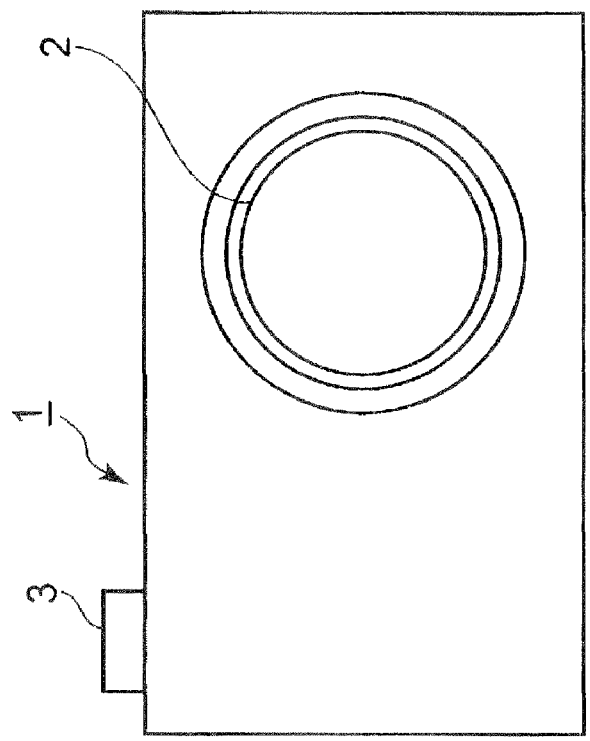

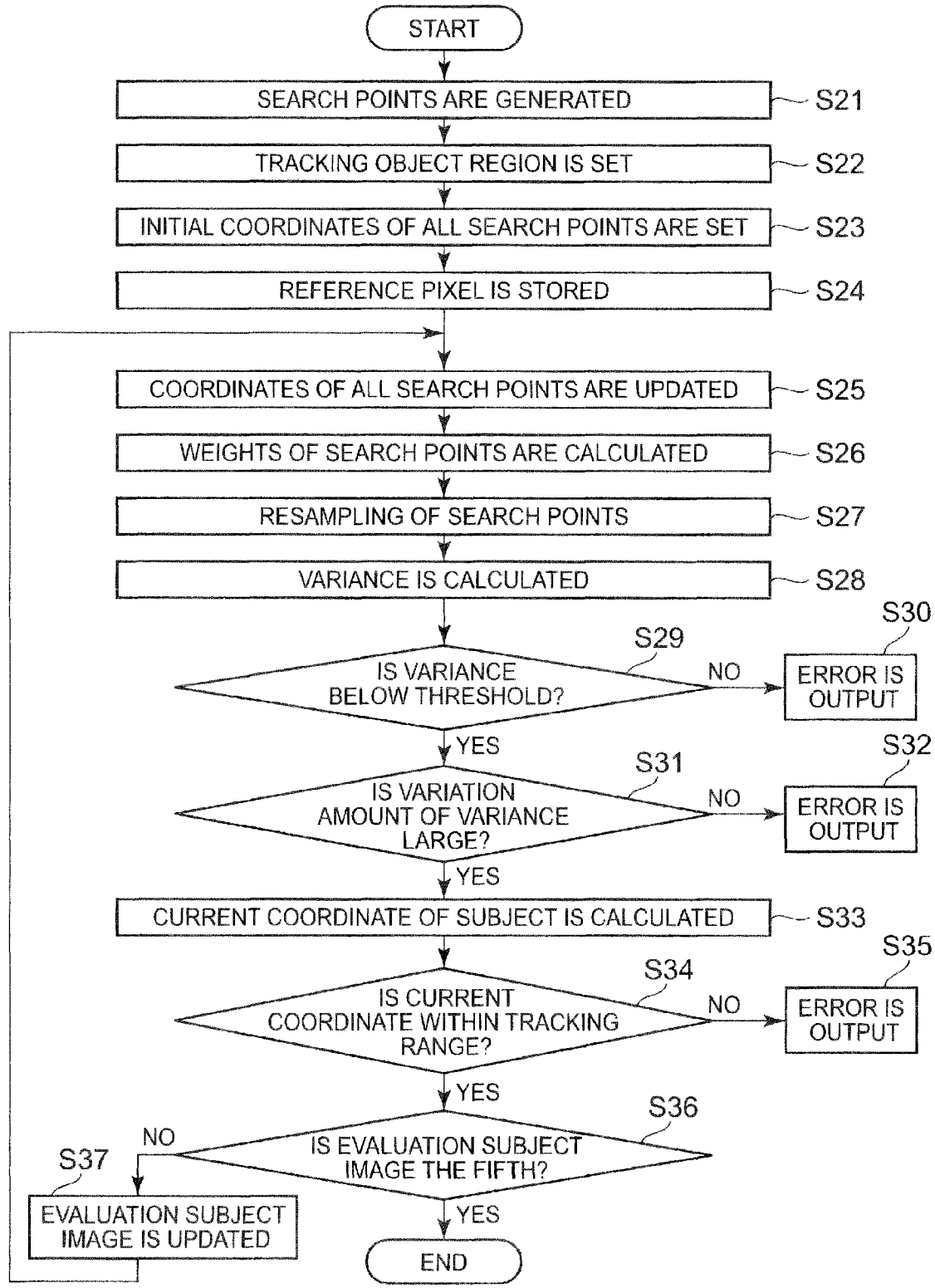

| NUMBER OF SEARCH POINT P | WEIGHT Pw | INTEGER CORRESPONDING TO SEARCH POINT P |
|---|---|---|
| 23 | 22 | 0-21 |
| 248 | 22 | 22-43 |
| 109 | 21 | 44-64 |
| 95 | 18 | 65-82 |
| 83 | 18 | 83-100 |
| ⋮ | ⋮ | ⋮ |
| 14 | 5 | 1014-1018 |
| 156 | 5 | 1019-1023 |

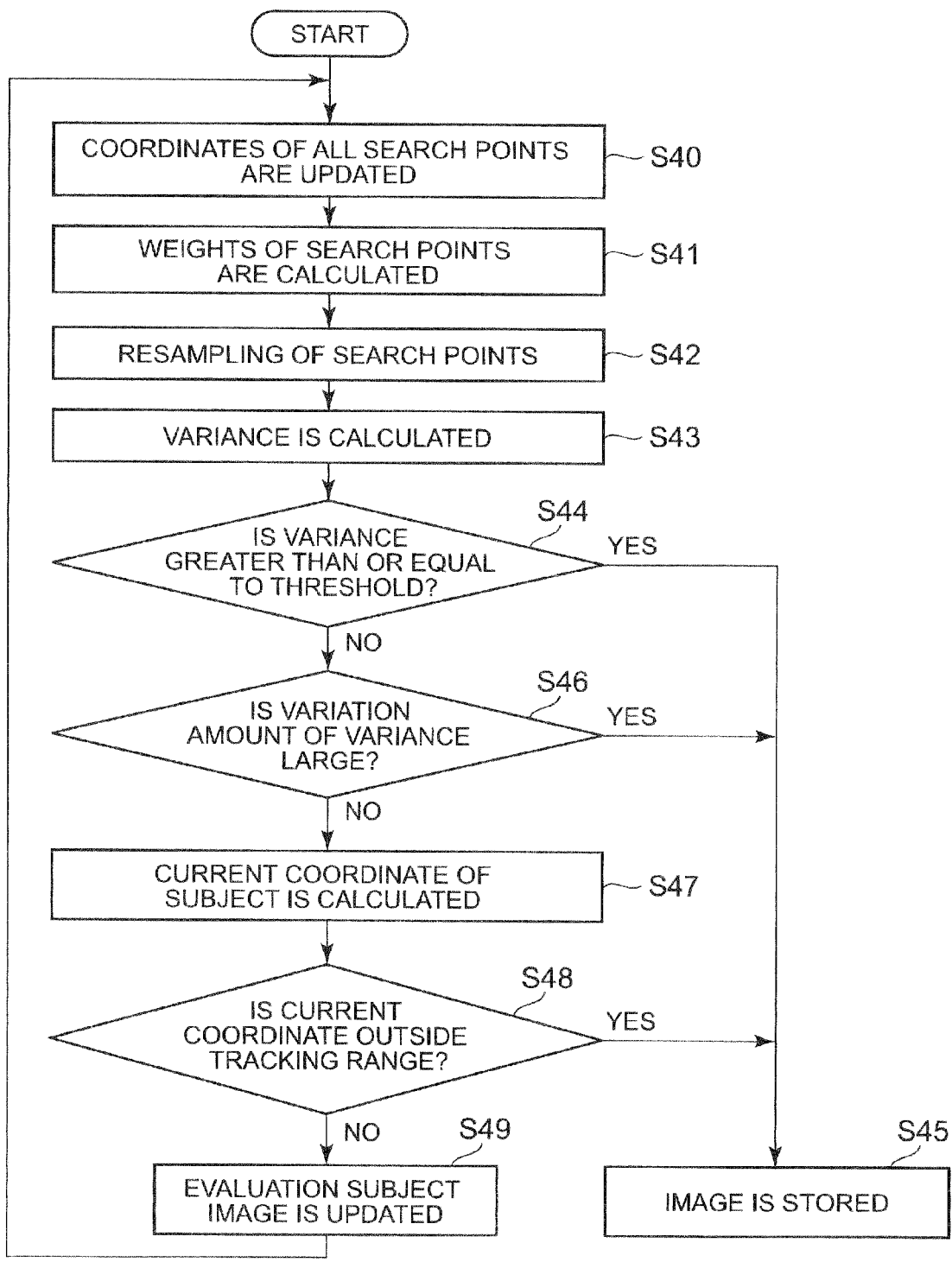

IMAGE RECORDING METHOD, IMAGE RECORDING DEVICE, AND STORAGE MEDIUM

This application is based on and claims the benefit of priority from Japanese Patent Application No. 2008-072302, filed on Mar. 19, 2008, the content of which is incorporated herein by reference.

BACKGROUND OF THE INVENTION

1. Field of the Invention

The present invention relates to an image recording method, an image recording device, and a storage medium. More specifically, the present invention relates to an image recording method and an image recording device sequentially obtaining consecutive images and recording one from among the images, and a storage medium.

2. Related Art

Conventionally, for such image pickup devices as digital cameras, methods for automatically recording images, using an action of a subject in an image as a cue, have been known. For example, using a block matching method to record images automatically has been known (see Japanese Unexamined Patent Application Publication No. H9-70012). That is to say, blocks including a subject in a predetermined image are stored, and in a consecutive sequence of images from this predetermined image, blocks similar to blocks including the subject are searched for. In this manner, by detecting the blocks, the subject is tracked, and an image is automatically recorded.

SUMMARY OF THE INVENTION

However, when photographing living creatures, such as animals or human beings, the subject tends to move his or her hands or legs, or changes the posture of his or her body. Therefore, using the above-mentioned simple tracking method, there were cases in which it was not possible to detect similar blocks, and not possible to track the subject. As a result, a drawback is encountered in that the reliability of automatic recording processing is deteriorated.

It is an object of the present invention to provide an image recording method, an image recording device, and a storage medium capable of reliably performing automatic recording processing for capturing an instant of motion or change of a subject and automatically storing the same.

In order to attain the above-mentioned object, in accordance with a first aspect of the present invention, there is provided an image recording method for sequentially obtaining consecutive images, and recording one image from among the images, comprising: an initialization step comprising: a step of setting a specified region and a tracking range surrounding the specified region within the image, a step of storing a characteristic value of the specified region within the image, and a step of generating a predetermined number of search points in the specified region of the image, a filtering step comprising: a step of updating coordinates of a plurality of search points by using a random number, a step of comparing the characteristic value of the specified region with a characteristic value of each of the search points after being updated in the image, assigning to the search points weights determined so as to be increased in proportion to a degree of similarity therebetween, a step of screening the search points according to the weights thus assigned thereto, a step of calculating a variance of the coordinates of the screened search points, a step of calculating a weighted average of the coordinates of the screened search points, and an image recording determination step of determining, based on the variance of the coordinates of the screened search points, the weighted average of the coordinates of the screened search points, and the tracking range, whether or riot to record the image, and recording the image in a case of determining to record the image.

Further, in an image recording method according to the present invention, the step of screening the search points according to the weights may have a step of calculating a summation of the weights of the search points, generating only a number of identifiers equal to this summation, associating the identifiers with the search points respectively according to the weights, selecting identifiers only the predetermined number of times randomly from among the identifiers, and stores the search points corresponding to the selected identifiers.

Further, in an image recording method according to the present invention, the step of screening the search points according to the weights may have a step eliminating search points each for which the weight is less than or equal to a predetermined threshold.

Further, an image recording method according to the present invention, may further comprise a learning step of executing the initialization step and the filtering step on a first image, and subsequently, repeating the filtering step for each of the images from the $2^{nd}$ to the $k^{th}$ (k being a natural number), and an image recording step of, for images of the $(k+1)^{st}$ or later, repeating the filtering step and the image recording determination step.

Further, in an image recording method according to the present invention, after executing the learning step, until executing the image recording step, the the specified region and the tracking range may be tracked and moved by repeating the filtering step.

Further, in an image recording method according to the present invention, characterized in that, in the step of calculating a weighted average of the coordinates of the screened search points in the learning step, in a case in which the weighted average of the coordinates of the screened search points is positioned exterior to the tracking range, an error may be output.

Further, in an image recording method according to the present invention, in the step of calculating a variance of the coordinates of the screened search points in the learning step, in a case in which the variance is greater than or equal to a predetermined threshold, an error may be output.

Further, in an image recording method according to the present inveniton, in the step of calculating a variance of the coordinates of the screened search points in the learning step, in a case in which the amount of variation of the variance from a previous variance is large, an error may be output.

Further, in an image recording method according to the present invention, in the step of calculating a weighted average of the coordinates of the screened search points in the image recording step, in a case in which the weighted average of the coordinates of the screened search points is positioned exterior to the tracking range, the image may be recorded.

Further, in an image recording method according to the present invention, in the step of calculating a variance of the coordinates of the screened search points in the image recording step, in a case in which the variance is greater than or equal to a predetermined threshold, the image may be recorded.

Further, in an image recording method according to the present inveniton, in the step of calculating a variance of the coordinates of the screened search points in the image recording step, in a case in which the amount of a variation of the variance from a previous variance is large, the image may be recorded.

In accordance with a second aspect of the present invention, there is provided a storage medium storing therein a program executable by a computer to carry out any one of the aforementioned image recording method according to the invention.

In accordance with a third aspect of the present invention, there is provided an image recording device for sequentially obtaining consecutive images, and recording one image from among the images, comprising: an initialization means for setting a specified region and a tracking range surrounding the specified region within the image, storing a characteristic value of the specified region within the image, and generating a predetermined number of search points in the specified region of the image, a filtering means for updating coordinates of a plurality of search points by using a random number, comparing the characteristic value of the specified region with a characteristic value of each of the search points after being updated in the image, assigning to the search points weights determined so as to be increased in proportion to a degree of similarity therebetween, screening the search points according to the weights thus assigned thereto, calculating a variance of the coordinates of the screened search points, and calculating a weighted average of the coordinates of the screened search points, and an image recording determination means for, based on the variance of the coordinates of the screened search points, the weighted average of the coordinates of the screened search points, and the tracking range, determining whether or not to record the image, and recording the image in a case of determining to record the image.

According to the present invention, it is possible to perform automatic recording processing reliably.

BRIEF DESCRIPTION OF THE DRAWINGS

FIG. 1 is a drawing showing the exterior of an image recording system according to a first embodiment of the present invention;

FIG. 8 is a flowchart of learning processing carried out by the image recording system according to the embodiment;

FIG. 16 is a flowchart of image recording processing of an image recording system according to the embodiment.

DETAILED DESCRIPTION OF THE INVENTION

Figure 2:
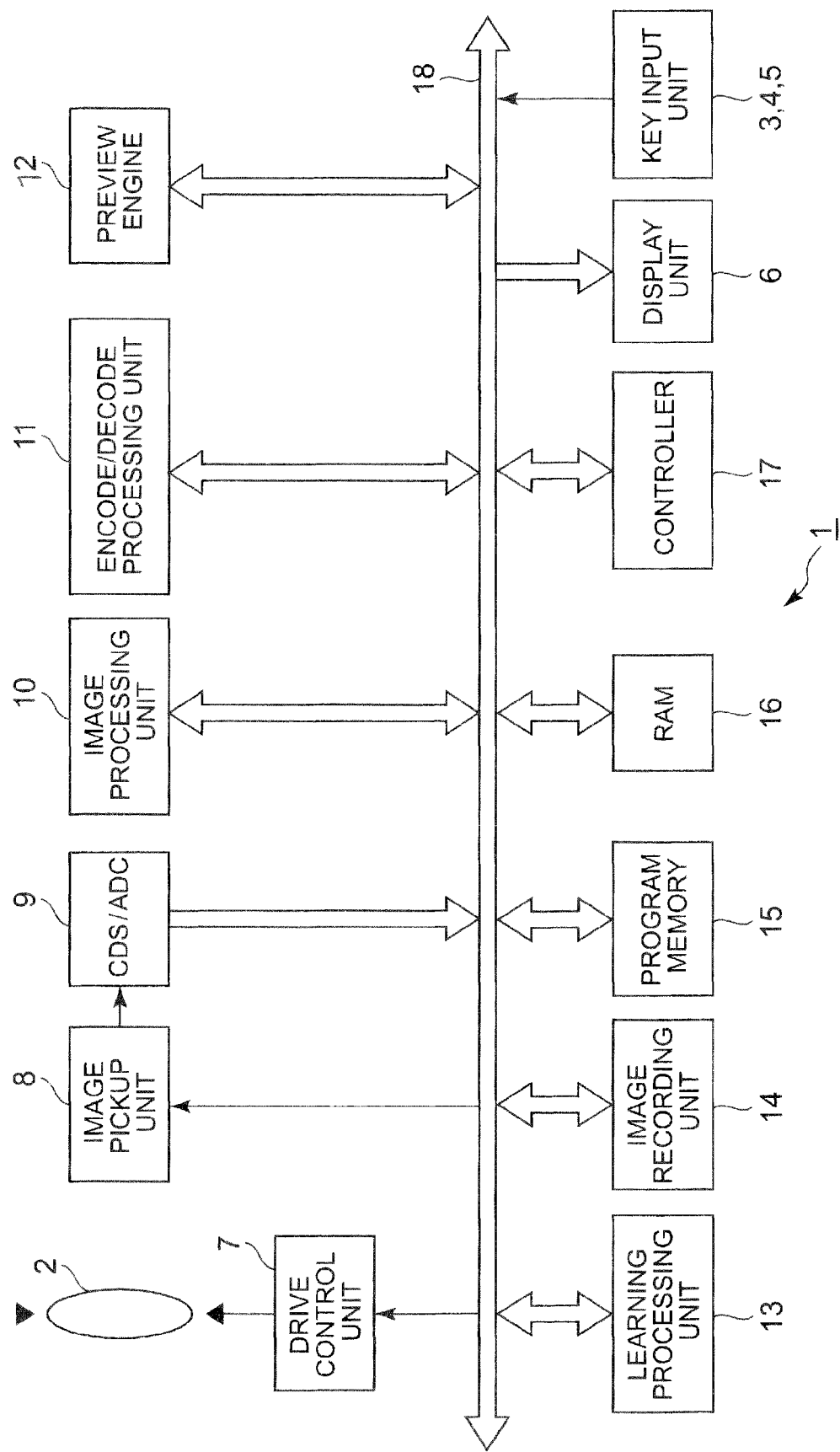
FIG. 2 is a block diagram showing a skeleton framework of the image recording system according to the embodiment.

Hereinafter, one embodiment of the present invention is explained with reference to the drawings.
[Outline View and Circuit Configuration]

FIG. 1(A) is a front view of the exterior of an image pickup device 1 as an image recording device according to the present embodiment, and FIG. 1(B) is a rear view thereof. On the front face of this image pickup device 1 is provided an image pickup lens 2, and on an upper face is provided a shutter button 3. This shutter button 3 is provided with a so-called "half-shutter function" capable of carrying out a half-press operation and a full-press operation.

Furthermore, on a back face are provided a function key 4, a cursor key 5, and a display unit 6. The cursor key 5 performs a role as a rotary switch capable of rotating in the directions a in the drawing.

FIG. 2 is a block diagram showing a skeleton framework of the image pickup device 1. This image pickup device 1 comprises a controller 17 connected to each unit through a bus line 18. The controller 17 is a one-chip microcomputer for controlling each unit of the image pickup device 1. In the same diagram, an image pickup lens 2 is, in more detail, a lens unit equipping optical members. Furthermore, a drive control unit 7 is a circuit unit for moving a position of an image pickup lens 2 based on control signals based on AF (Auto-Focus) processing from the controller 17 by way of detection of a zoom operation by a photographer or a half-press operation of the shutter button 3 by the photographer.

An image pickup unit 8 is composed of an image sensor such as a CMOS, and is positioned on an optical axis of the above-mentioned image pickup lens 2. A unit circuit 9 is a circuit for converting analog image signals according to an optical image of a subject output from the image pickup unit 8 to digital signals. This unit circuit 9 is configured of a CDS for storing image signals that are input, an Automatic Gain Control (AGC) amplifier for amplifying the image signal accompanying. AE (Auto Exposure adjustment) processing and the like, an A/D Converter (ADC) for converting the amplified image signals into digital image signals, and the like.

The output signals of the image pickup unit 8 are each sent as digital signals through the unit circuit 9 to an image processing unit 10, and subject to various image processing, and subject to reduction processing at a preview engine 12, and are supplied to a display unit 6. The display unit 6 consists of an LCD having a 16:9 aspect ratio, and incorporates a driver. When this digital signal and a drive control signal for driving the driver are input, an image based on the digital signal is displayed as a through image on a lower layer. Furthermore, the display unit 6 displays messages or icons and the like output from the controller 17 on an upper layer.

In addition, in an image recording mode, signals processed by the image processing unit 10 are compression coded by an encode/decode processing unit 11, and stored in an image recording unit 14 as files in a predetermined file format such as JPEG format or the like. On the other hand, in an image playback mode, image files read in from an image recording unit 14 are decoded by the encode/decode processing unit 11, and displayed by the display unit 6.

The preview engine 12 performs, aside from generation of the above-mentioned through image, necessary control when displaying an image in the image recording mode, just before being stored in the image recording unit 14, on the display unit 6. In addition, a program memory 15 and RAM 16 for temporarily storing serially taken images are connected to the bus line 18. In the program memory 15, a program for performing processing described hereinafter with reference to the flowchart is stored.

The controller 17 reads in a program from the program memory 15, controls each unit of the digital camera, and performs AE control processing based on brightness information included in the image signal, AF control processing by way of a contrast detection method, and the automatic recording processing hereinafter described. A learning processing unit 13 is a circuit unit for performing learning processing, hereinafter described, when performing the automatic recording processing.

[Automatic Recording Processing]

Figure 3:
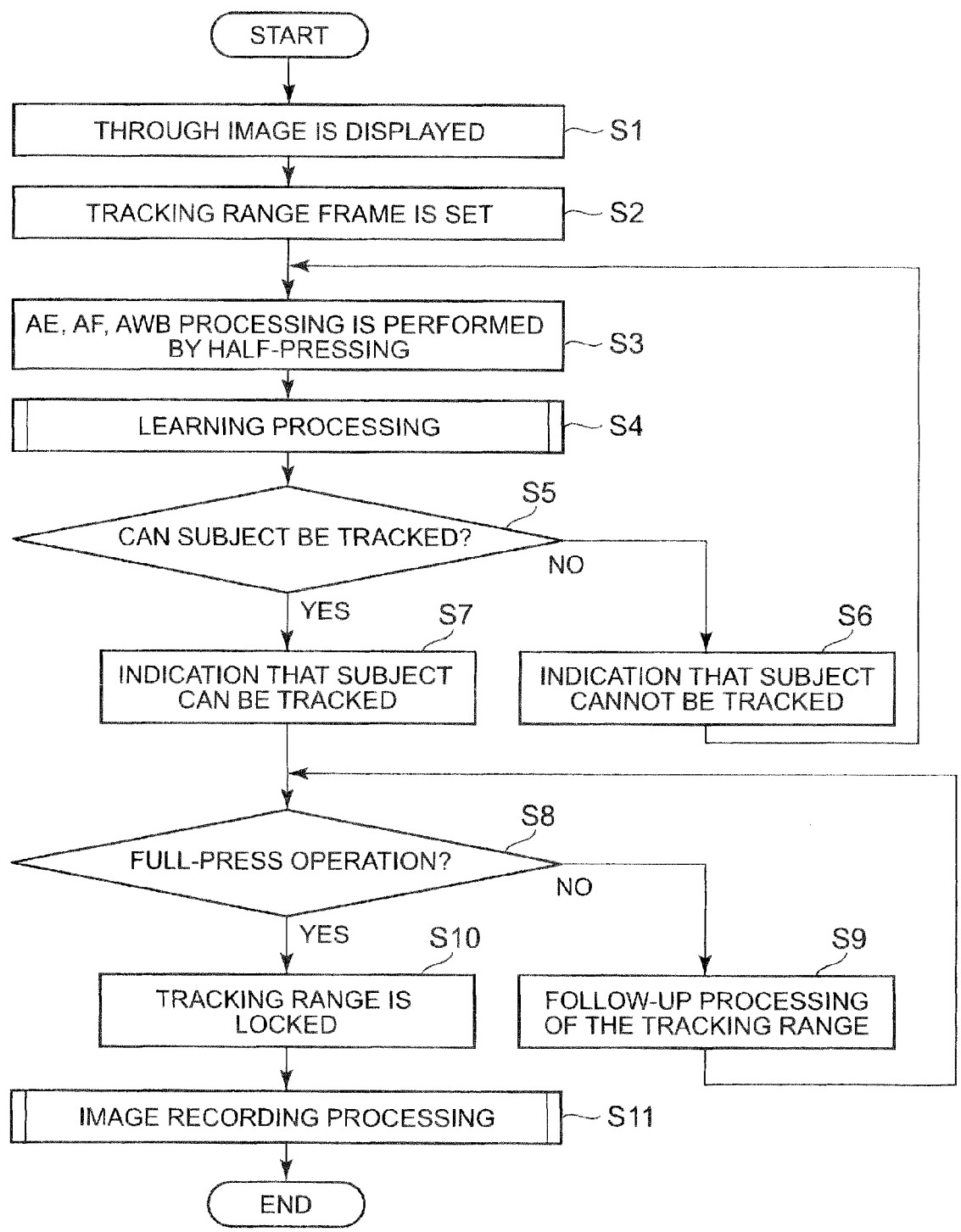
FIG. 3 is a flowchart of automatic recording processing carried out by the image recording system according to the embodiment.

Next, the automatic recording processing of the image pickup device 1 is described with reference to the flowchart in FIG. 3. First, a user operates the function key 4 and the cursor key 5, setting the mode to image recording, and additionally selects the automatic recording function. Then, the controller 17 detects this operation, reads out a program related to automatic recording processing from the program memory 15, and performs automatic recording processing.

In Step S1, a through image is displayed on a lower layer of the display unit 6, and an icon representing an image recording mode accompanying automatic recording processing, and a range for tracking a subject (hereinafter called a "tracking range"), are displayed on an upper layer of the display unit 6.

Figure 4:
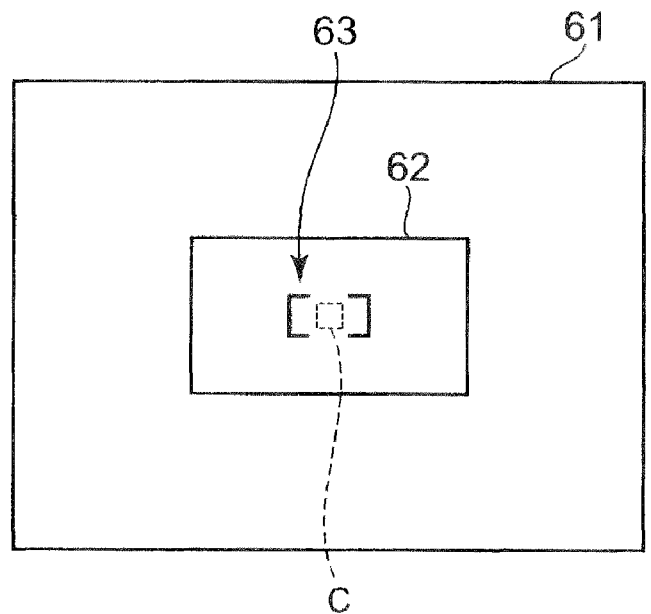
FIG. 4 is a drawing showing a display region of the image recording system according to the embodiment.

More specifically, as shown in FIG. 4, a focus area 63 for determining a subject is displayed at the center of the display region 61 of the display unit 6, and a tracking object area C is defined at the center of the focus area 63. Furthermore, a tracking range 62 is displayed surrounding the tracking object area C in the display area 61 of the display unit 6.

In Step S2, the user changes the orientation of the image pickup device 1 so that the subject is positioned in the focus area 63, and additionally, operates the function key 4 and the cursor key 5 to change the width and height of the tracking range 62 when setting the range of the tracking range 62.

Figure 5:
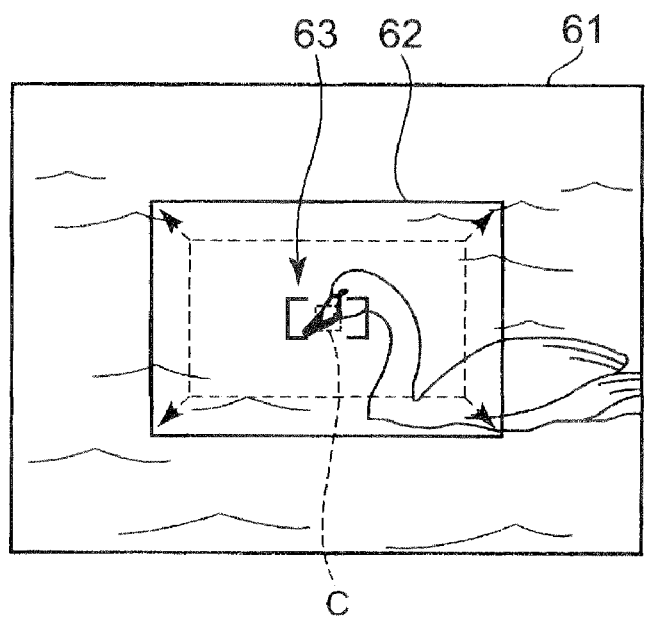
FIG. 5 is a drawing showing a state of displaying one portion of a subject in a display region according to the embodiment.

More specifically, here, as shown in FIG. 5, the user adjusts the orientation of the image pickup device 1 so that a bird is the subject, and displays the same in the display area 61. Then, the bill portion, which is a characterizing portion of the subject bird, is positioned in the tracking object area C. Next, while the behavior of the bird is observed, the cursor key 5 is rotated to the right or left in adjusting the scope of the tracking range 62, and the function key 4 is operated to set the scope of the tracking range 62.

In Step S3, the user operates the shutter button 3 by half-pressing the same. Then, the controller 17 detects this operation, and performs AF (Auto-Focus) processing, AE (Auto Exposure adjustment) processing, and AWB (Automatic White Balance) processing.

In Step S4, five images are obtained from the through-displayed images, and learning processing which tracks the subject is performed. This learning processing is described in detail hereinafter. In Step S5, as a result of the learning processing, whether the subject can be tracked is determined. In a case in which this determination is NO, an indication that the subject cannot be tracked is displayed in the display area 61 of the display unit 6 (Step S6), and the control returns to Step S3. On the other hand, in a case in which this determination is YES, an indication that the subject can be tracked is displayed in the display area 61 of the display unit 6 (Step S7), and the control transitions to step S8.

In Step S8, whether the shutter button 3 has been subject to a full-press operation is determined. In a case in which this determination is NO, the control transitions to Step S9, and in a case of YES, the position in the tracking range 62 of the display area 61 is locked (Step S10), and the control transitions to Step S11.

Figure 6:
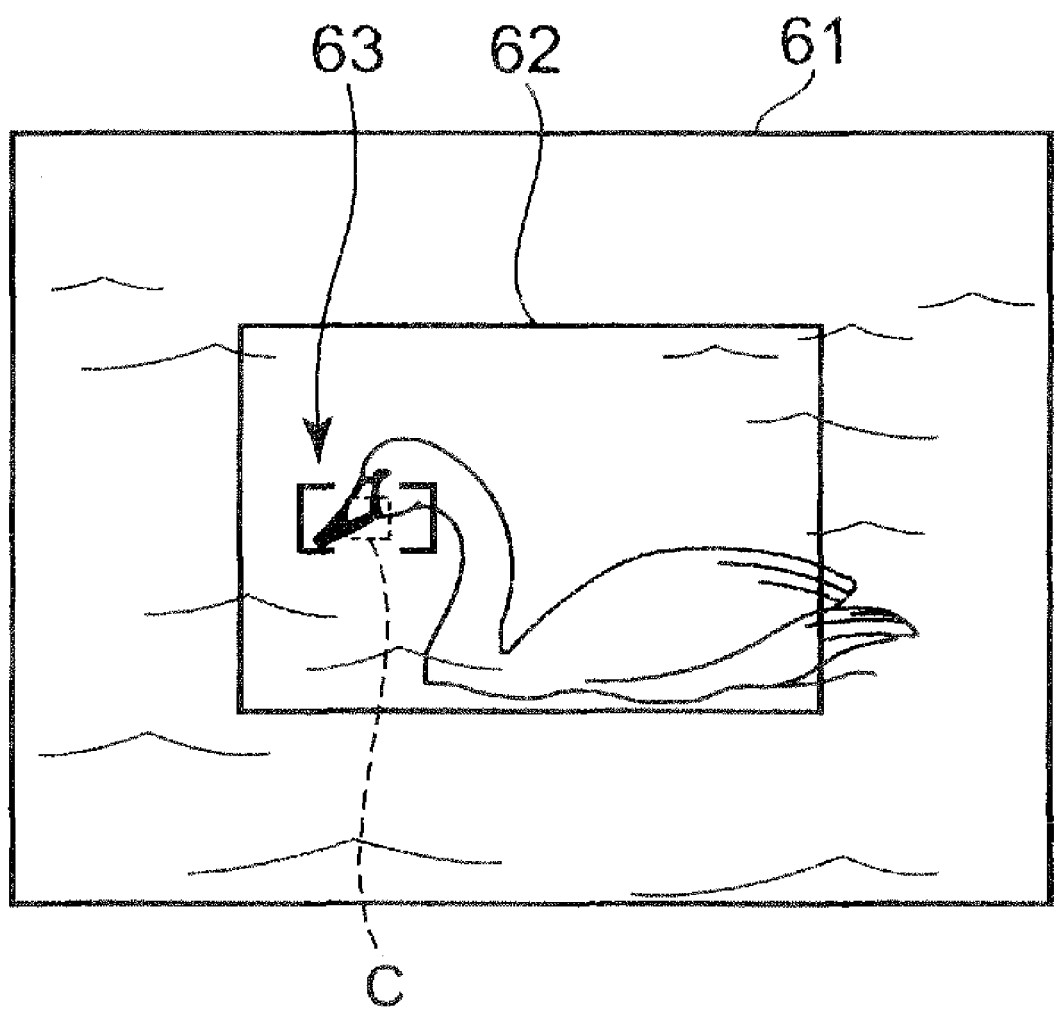
FIG. 6 is a drawing showing a state of displaying an entirety of a subject in a display region according to the embodiment.

In Step S9, the user orients the camera and performs framing. Then, the controller 17 performs follow-up processing accompanying this framing. That is to say, in the display region 61 of the display unit 6, the subject moves due to the framing, so the tracking object region C and the tracking range 62 are moved to follow the subject itself, and the control returns to Step S8. This follow-up processing is described in detail later. More specifically, as shown in FIG. 6, when the user performs framing so that the entirety of the bird, which is the subject, is enclosed in the display region 61, the tracking object region C and the tracking range 62 move in the display region 61 in tracking the bill of the bird.

Figure 7A:
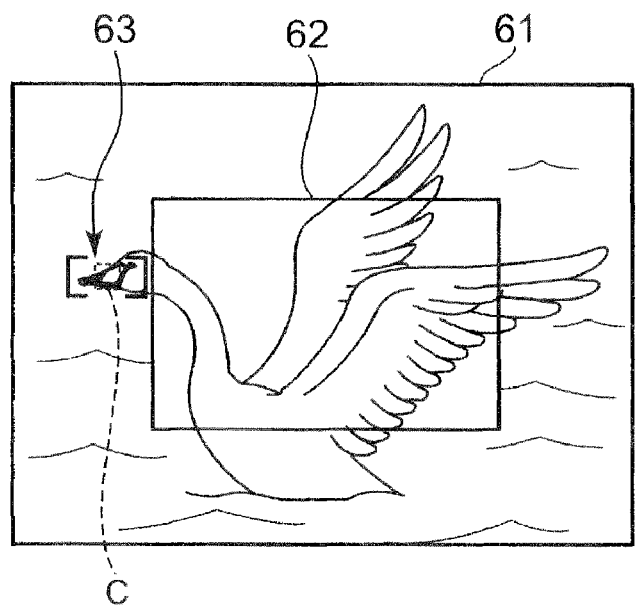
FIG. 7 is a drawing showing a state in which a subject displayed in a display region according to the embodiment has moved.
Figure 7B:
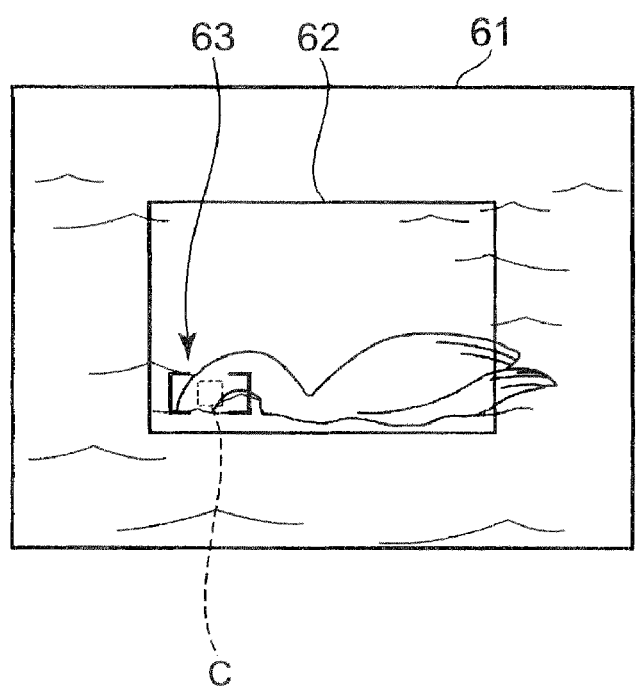

In Step S11, movement or change of the subject is detected, and image recording processing for storing the image is performed, completing the same. This image recording processing is described in detail hereinafter. More specifically, as shown in FIGS. 7(A) and 7(B), if the bird which is the subject attempts to fly or put the head thereof into water, this action of the bird is detected, and an image of that instant is stored.

[Learning Processing]

Hereinafter, the learning processing of Step S4 is described with reference to the flowchart of FIG. 8. As described above, learning processing is performed sequentially on evaluation subject images, with five through images obtained as these evaluation subject images. In Step S21, a predetermined number of search points P are generated for the evaluation subject image. More specifically, the number of search points P is set at 256. Then, the coordinates of the search points P are represented as P[num] ($P_x$[num], $P_y$[num]) (0<=num<=255). In the present embodiment, the number of search points has been set at 256, but is not limited to this, and may be suitably determined based on the processing power of the CPU provided in the image pickup device 1.

In Step S22, a predetermined range centering on each search point P[num] is set as a search object range T[num]. More specifically, this search object range T[num] is represented by the following formula (1).

$$T[num]=\{Q(P_x[num]+p, P_y[num]+k)|-size \leq p \leq size, -size \leq k \leq size\} \quad (1)$$

Figure 9:
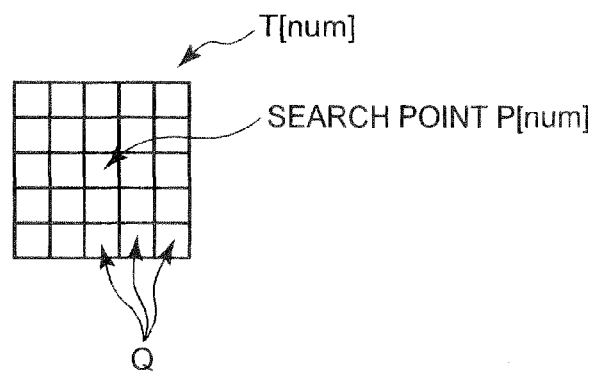
FIG. 9 is a drawing explaining a search region of the learning processing according to the embodiment.

More specifically, SIZE=2 is set, and as shown in FIG. 9, a search object range T is set as a range centered on each search point of 5 pixels vertically and 5 pixels horizontally. Moreover, in the present embodiment, SIZE=2 has been set for ease of understanding, but is not limited to this. That is to say, in order to carry out real-time measurements while maintaining learning precision, 4<SIZE<10 is preferable.

In Step S23, the initial coordinates of all search points P[num] are set to center on focus area 63. That is to say, when the center coordinates of the focus area 63 are set to $(F_x, F_y)$, the initial coordinates of the search coordinates P[num] are represented as in the following formula (2).

$$P[\text{num}](P_X[\text{num}], P_Y[\text{num}]) = (F_X, F_Y) \quad (2)$$

Figure 10:
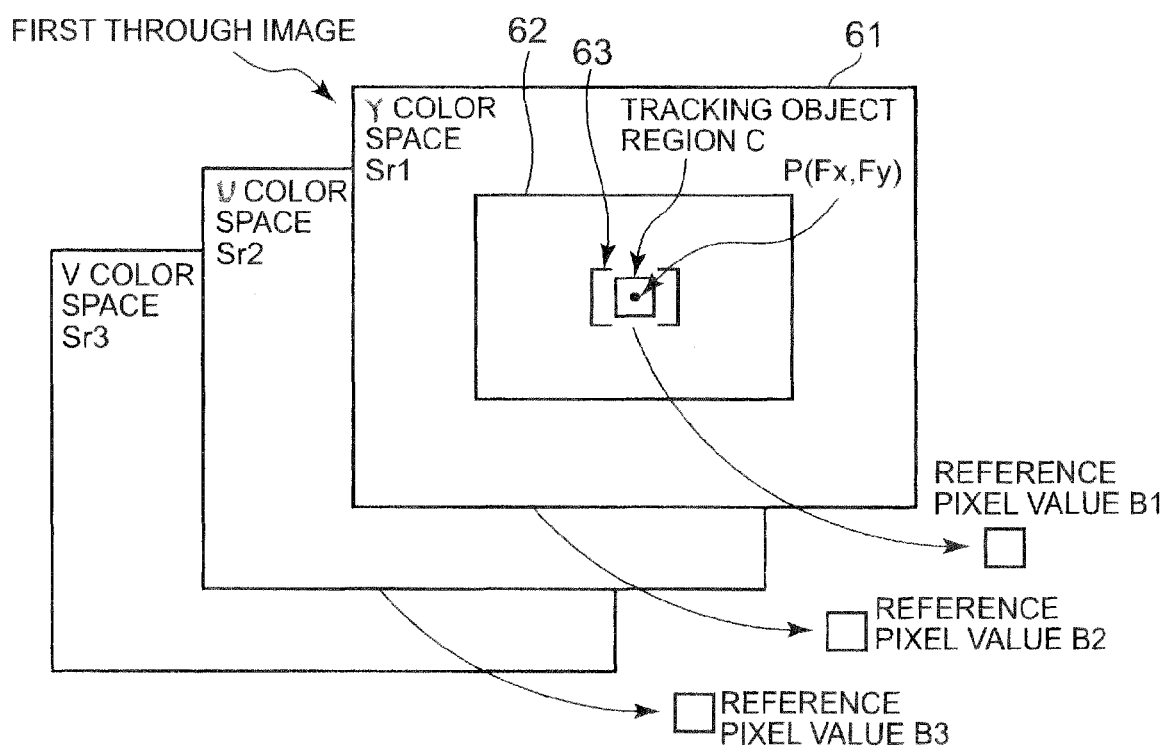
FIG. 10 is a drawing explaining a procedure of calculating a reference pixel value of the learning processing according to the embodiment.

In Step S24, as shown in FIG. 10, the initial position of the search object range T[num] is set to the tracking object region C. In each color space of YUV of a first evaluation subject image, the pixel values of the pixels Q configuring the tracking object region C are calculated, and stored as reference pixel values B1, B2, and B3. Setting the Y color space of the evaluation subject image as Sr1, the U color space as Sr2, and the V color space as Sr3, the reference pixel values B1, B2, and B3 are represented as in the following formulae (3) to (5).

$$B1(p,k) = Sr1(F_X+p, F_Y+k) \quad (3)$$

$$B2(p,k) = Sr2(F_X+p, F_Y+k) \quad (4)$$

$$B3(p,k) = Sr3(F_X+p, F_Y+k) \quad (5)$$

$$-\text{size} \leq p \leq \text{size}, -\text{size} \leq k \leq \text{size}$$

In the present embodiment, the YUV color space has been used as the color space for the evaluation subject image, but is not limited to this. Use of the RGB color space, HSV color space, HLS color space, or OHHTA color space or the like is acceptable, and may be suitably selected according to the color space of through image output of the camera.

Figures 11, 12:
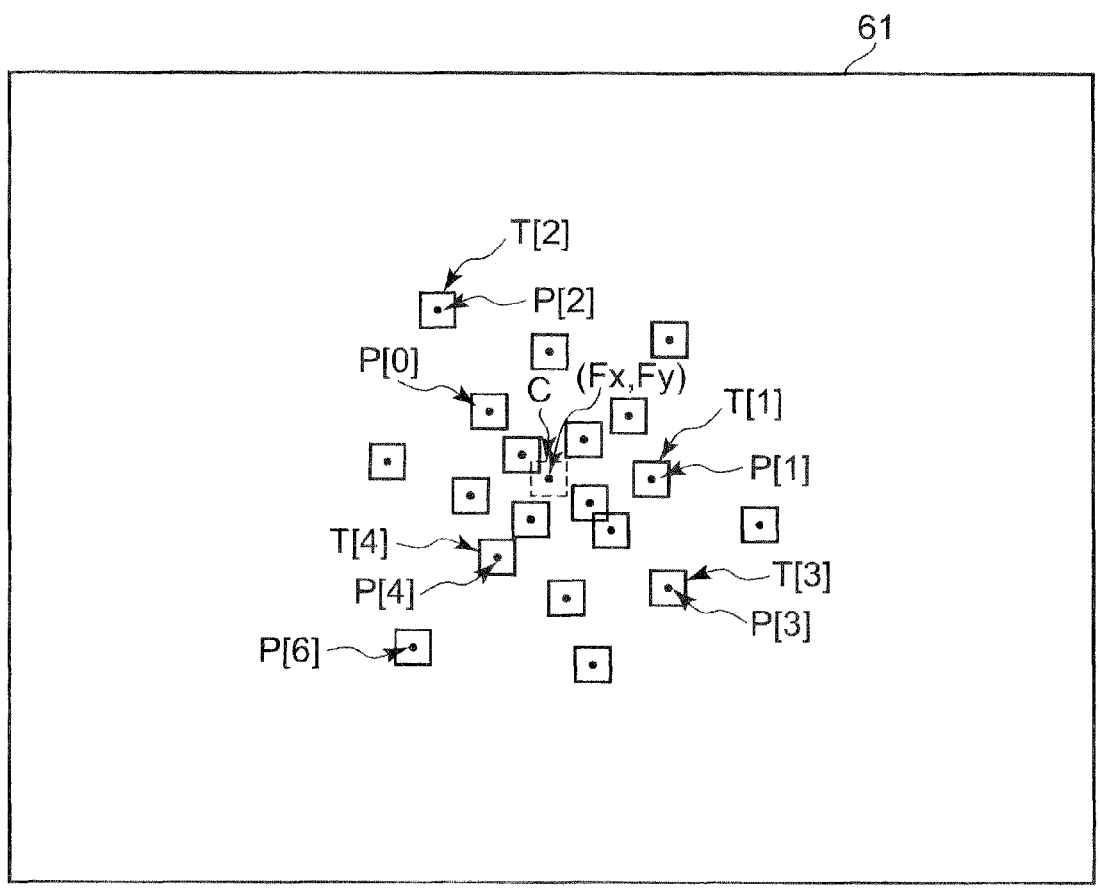
FIG. 11 is a drawing showing a distribution of search points of the learning processing according to the embodiment.
FIG. 12 is a drawing explaining procedures of resampling and sampling of the learning processing according to the embodiment.

In Step S25, using a random number according to a normal distribution, the coordinates of all search points P[num] are updated. Then, as shown in FIG. 11, the search points P are distributed in the display region 61. In FIG. 11, in order to facilitate understanding, only 20 of the 256 search points P are shown. That is to say, as random numbers according to a normal distribution of average $\mu$ and variance $\sigma 2$ as $N(\mu, \sigma 2)$, the coordinates of search points P[num] are updated according to the following formula (6).

$$P[\text{num}](P_X[\text{num}], P_Y[\text{num}]) = (P_X[\text{num}] + N(\mu, \sigma 2), P_Y[\text{num}] + N(\mu, \sigma 2)) \quad (6)$$

In Step S26, the weight of each search point is calculated More specifically, in each YUV color space of the evaluation subject image, the pixel values of the pixels Q configuring the search object range T[num] are calculated. In addition, these pixel values and the differences from the stored reference pixel values B1 to B3 are calculated, the number of pixels for which these differences are within a predetermined range is counted, and this number is defined as a weight of the search points. Therefore, if a weight is large, that means that the search object range T[num] of the evaluation subject image and the tracking object region C of the first evaluation subject image are similar.

More specifically, with the upper and lower threshold values as TH1 and TH2, the number of pixels Q satisfying the following formulae (7) to (9) is counted, and defined as the weight Pw[num]. In the present embodiment, with SIZE as 2, there were 25 pixels Q configuring each search object range T[num], so the minimum weight Pw[num] was 0, and the maximum was 25.

$$TH1 \leq B1(i,j) - Sr1(P_X[\text{num}]+i, P_Y[\text{num}]+j) \leq TH2 \quad (7)$$

$$TH1 \leq B2(i,j) - Sr2(P_X[\text{num}]+i, P_Y[\text{num}]+j) \leq TH2 \quad (8)$$

$$TH1 \leq B3(i,j) - Sr3(P_X[\text{num}]+i, P_Y[\text{num}]+j) \leq TH2 \quad (9)$$

$$-\text{size} \leq i \leq \text{size}, -\text{size} \leq j \leq \text{size}$$

In Step S27, a resampling of the search points P is performed. That is to say, a summation of the weights Pw of the search points P is defined as a predetermined value N. Next, N identifiers are generated, and each of these N identifiers is assigned to a search point P according to a weight Pw. In other words, the larger the weight Pw of the search point P, the more identifiers correspond to the search point P. Next, processing for randomly selecting one from among the N identifiers is repeated a number of times equal to the number of search points P, and the search points P corresponding to these selected identifiers are stored as 256 new search points P[num]. Here, there is a case in which a specific search point P may be selected a plurality of times, but in this case, the specific search point P is stored a plurality of times.

More specifically, as shown in FIG. 12, the summation N of weights Pw is set at 1024, and integers between 0 and 1023 are generated as identifiers. Additionally, each of these 1024 integers is assigned to a search point P according to a weight Pw. For example, since the search point P[23] has a weight Pw of 22, it corresponds to integers 0 to 21. The search point P[248] has a weight Pw of 22, and therefore corresponds to integers 22 to 43.

Next, random numbers are generated 256 times in a range of 0 to 1023, values equal to the generated random numbers are extracted from among the 1024 integers, and search points P corresponding to these extracted values are stored as new search points P[num].

In other words, by way of processing of the above-mentioned Step S27, specific search points are selected from among the P[num], and numbers from 0 to 255 are assigned and stored as new P[num] thereof.

Figure 13:
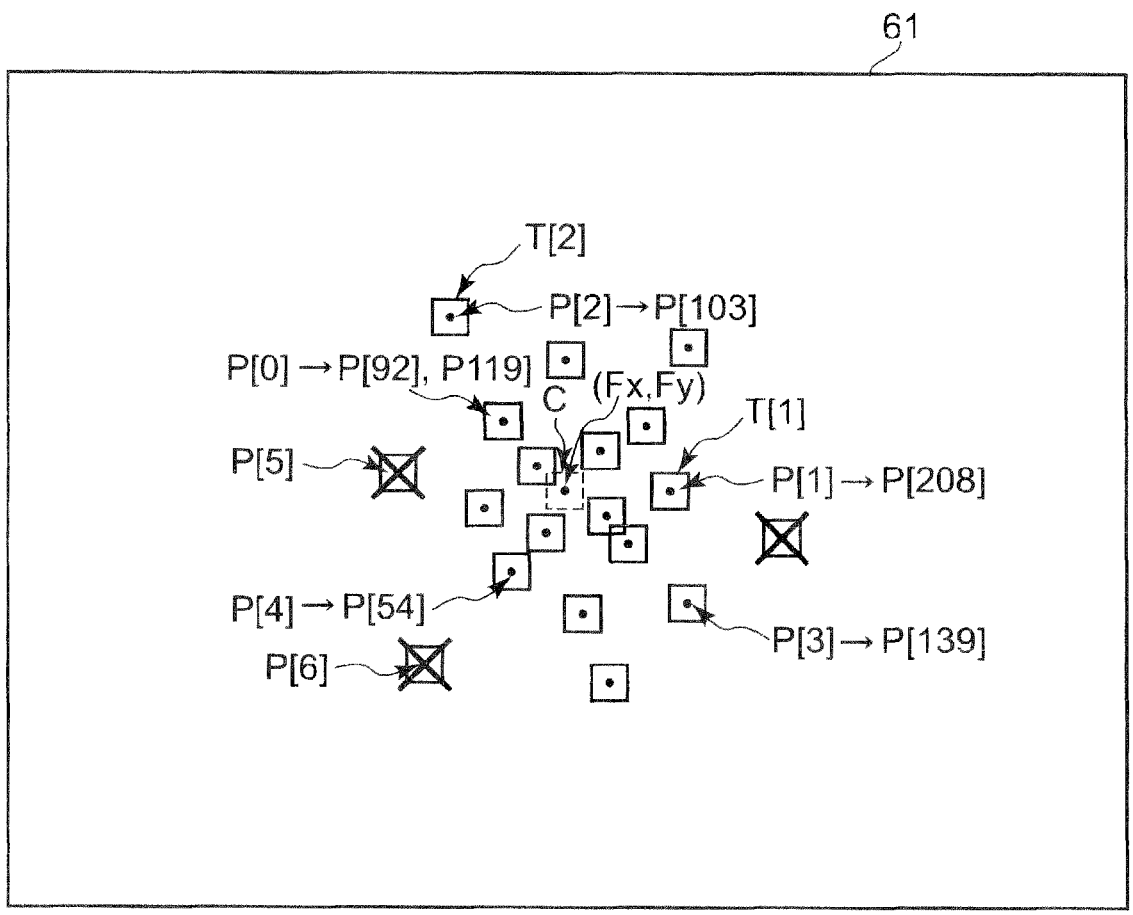
FIG. 13 is a drawing showing the results of performing resampling and sampling on search points of the learning processing according to the embodiment.
Figure 14A:
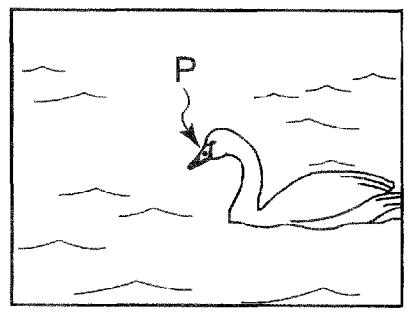
FIG. 14 is a drawing showing a change of distribution of the search points obtained by carrying out learning processing, according to the embodiment, on images of a temporal sequence in which a bird is displayed.
Figure 14B:
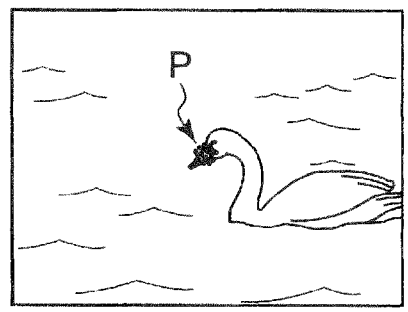
Figure 14C:
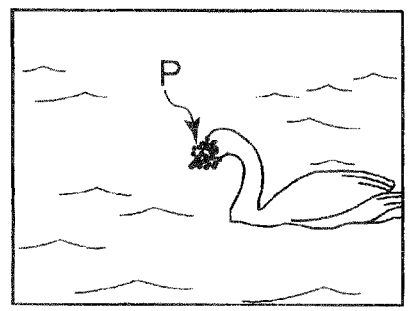
Figure 14D:
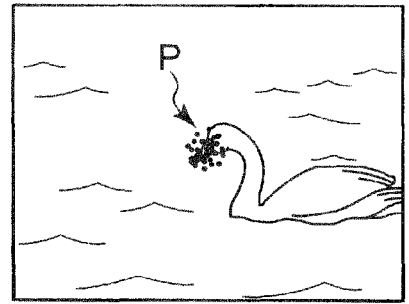
Figure 14E:
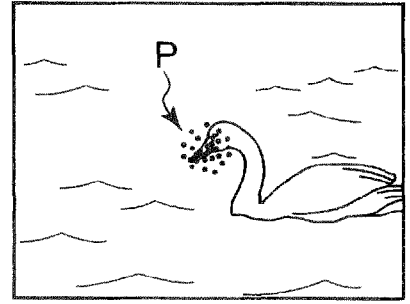
Figure 15A:
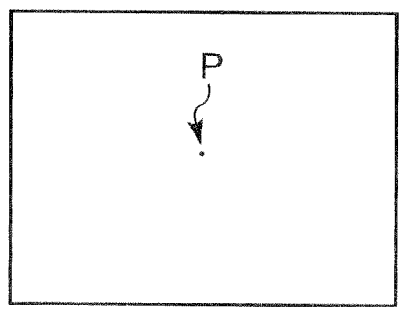
FIG. 15 is a drawing showing a change of distribution of the search points obtained by carrying out learning processing, according to the embodiment, on images of a temporal sequence in which a wall of a building is displayed.
Figure 15B:
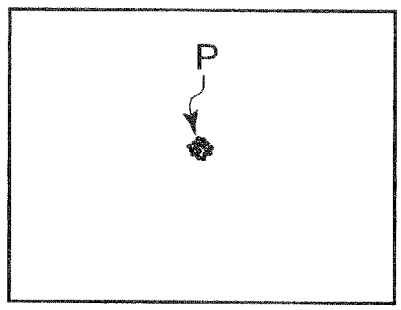
Figure 15C:
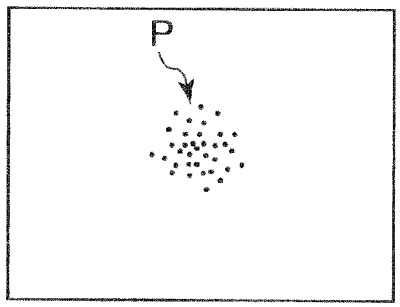
Figure 15D:
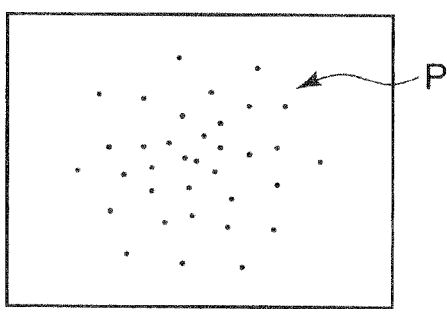
Figure 15E:
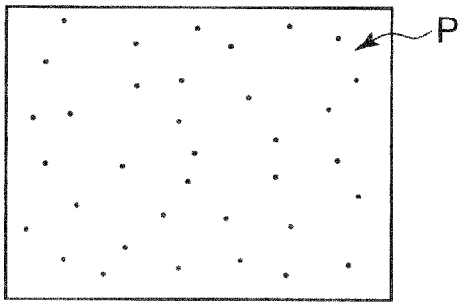

More specifically, the distribution of search points P in the display region 61 transitions from the state shown in FIG. 11 to the state shown in FIG. 13. For example, since P[5] and P[6] have not been selected by way of random numbers, they are deleted. On the other hand, P[0] is stored as new P[92] and P[119], P[1] is stored as a new P[208], and P[2] is stored as a new P[103]. Furthermore, P[3] is stored as a new P[139], and P[4] is stored as a new P[54].

In Step S28, the variance V of the coordinates of a new search point P[num] is calculated, and in Step S29, whether this variance V is below a predetermined threshold value or not is determined. In a case in which this determination is NO, since the subject cannot be tracked, the control transitions to Step S30, and a learning error is output. On the other hand, in a case in which this determination is YES, the control transitions to Step S31.

In Step S31, whether the amount of variation of the variance V from last time is large is determined. In a case in which this determination is NO, the control transitions to Step S32, and since the subject cannot be tracked, a learning error is output. On the other hand, in a case in which this determination is YES, the control transitions to Step S33.

In Step S33, a weighted average of the coordinates of all the search points P[num] is calculated as the current coordinate of the subject, and in Step S34, whether the coordinate is positioned in a tracking range of the evaluation subject image is determined. In a case in which this determination is NO, since the subject cannot be tracked, the control transitions to Step S35, and a learning error is output. On the other hand, in a case in which this determination is YES, the control transitions to Step S36.

In Step S36, whether the current evaluation subject image is the fifth is determined. In a case in which this determination is YES, the step is completed, and in a case in which this determination is NO, the evaluation subject image is updated to the next image (Step S37), the control returns to Step S25, and loop processing is performed.

FIG. 14 is a drawing showing a change of distribution of the search points P obtained by executing the above-mentioned learning processing on images of a temporal sequence in which a bird is displayed. FIG. 15 is a drawing showing a change of distribution of the search points P obtained by executing the above-mentioned learning processing on images of a temporal sequence in which a wall of a building is displayed. In the images in which a bird is displayed, as shown in FIGS. 14(a) to 14(e), since there is a characteristic in the bill of the bird, the search points P are not so dispersed, and a learning error does not occur. On the other hand, in the image in which a wall of a building is displayed, as shown in FIGS. 15(a) to 15(e), since the texture of the wall of the building is uniform, the search points P are dispersed, and a learning error occurs.

[Image Storage Processing]

Hereinafter, image recording processing is explained with reference to the flowchart of FIG. 16. Steps S40 to S43 are identical in processing to Steps S25 to S28 for learning processing.

In Step S44, whether the variance V is greater than or equal to a threshold is determined. In a case in which this determination is YES, it can be considered that either the subject has moved so fast as to be untrackable, or sight of the subject has been lost, so the control transitions to Step S45, and the image is stored. On the other hand, in a case in which this determination is NO, the control transitions to Step S46.

In Step S46, whether the amount of variation of the variance V from the last time is large is determined. In a case in which the variation of the variance V is large, for example, if a bird or insect has beaten wings of the same, or the like, it can be considered that the shape of the subject has changed significantly. For example, there is a case in which both of the following formulae (10) and (11) are satisfied.

$$((V(n)-V(n-1))*K_V > V(n) \tag{10}$$

$$V(n) > V(n-1) \tag{11}$$

V(n): Variance of the Current Evaluation Subject Image
V(n−1): Variance of the Previous Evaluation Subject Image
$K_V$: Variation Tolerance Coefficient In a case in which the determination of Step S46 is YES, the control transitions to Step S45, and an image is stored. On the other hand, in a case in which this determination is NO, the control transitions to Step S47. Step S47 is processing identical to Step S33 for learning processing.

In Step S48, whether the current coordinate Pn of the subject is outside the tracking range 62 is determined. In a case in which this determination is YES, since it can be considered that the subject has moved, the control transitions to Step S45, and an image is stored. On the other hand, in a case in which this determination is NO, the control transitions to Step S49.

Step S49 is processing identical to Step S37 for learning processing. Following this Step S49, the control returns to Step S40.

[Tracking Processing]

In tracking processing, the tracking range 62 is moved in the display region 61 so that the current coordinate Pn of the subject is centered. Moreover, in this tracking processing, loop processing of Steps S25 to S37 for learning processing is continually performed. However, since the subject has once been determined to be trackable, error determination for Steps S29, S31, and S34 is not performed.

As described above, the threshold of variance V is used for the determination performed in Steps S29 for learning processing and in S44 for image recording processing. Furthermore, the amount of variation of the variance V is used in a determination performed in Steps S31 for learning processing and in S46 for image recording processing. In addition, the position and size of the tracking range are used in the determination performed in Steps S34 for learning processing and S48 for image recording processing.

Therefore, by operating the function key 4 and the cursor key 5 in suitably setting a threshold of the variance V, the amount of variation of the variance V, and the position and size of the tracking range, setting the sensitivity of automatic recording at any arbitrary level is possible. However, if automatic recording is set to be performed even when the amount of movement of a subject or the amount of variation of the shape of the subject is small, learning errors in learning processing are more likely to be output, but the sensitivity of automatic recording can be set to high sensitivity. On the other hand, if automatic recording is set not to be performed unless the amount of movement of the subject or the amount of variation of the shape of the subject is large, the sensitivity of automatic recording becomes low, but learning errors in learning processing can be made less likely to be output.

According to the present embodiment, the following effects are provided.

(1) In the learning processing, whether tracking a subject is possible or not, that is to say, whether automatic recording is possible or not, is determined, and the result is displayed on the display unit 6. Therefore, by a user reconfiguring parameters, automatic recording can be performed with certainty. As a result, carrying out automatic recording processing is possible with stability.

(2) By operating the shutter button 3 by half-pressing, the tracking object region C and the tracking range 62 move by tracking the subject, so a user is able to perform automatic recording with a desired composition by way of framing.

(3) By operating the shutter button 3 by full-pressing, the position of the tracking range 62 in the display region 61 is locked. If the subject moves or changes in shape, then automatic recording is performed. As a result, without causing the user to be tense, it is possible to capture an instant of movement or an instant of changing shape of the subject with certainty, and automatically to record thereof. For example, an instant in which an animal or an insect takes off, a human being kicks a soccer ball, a golf club impacts a golf ball, or the like can automatically be recorded.

(4) By the function key 4 and the cursor key 5, the position and size of the tracking range, the threshold of the variance V, and the amount of variation of the variance V are configurable, so it is possible for the user to set the sensitivity of automatic recording at any arbitrary level.

Figure 17:
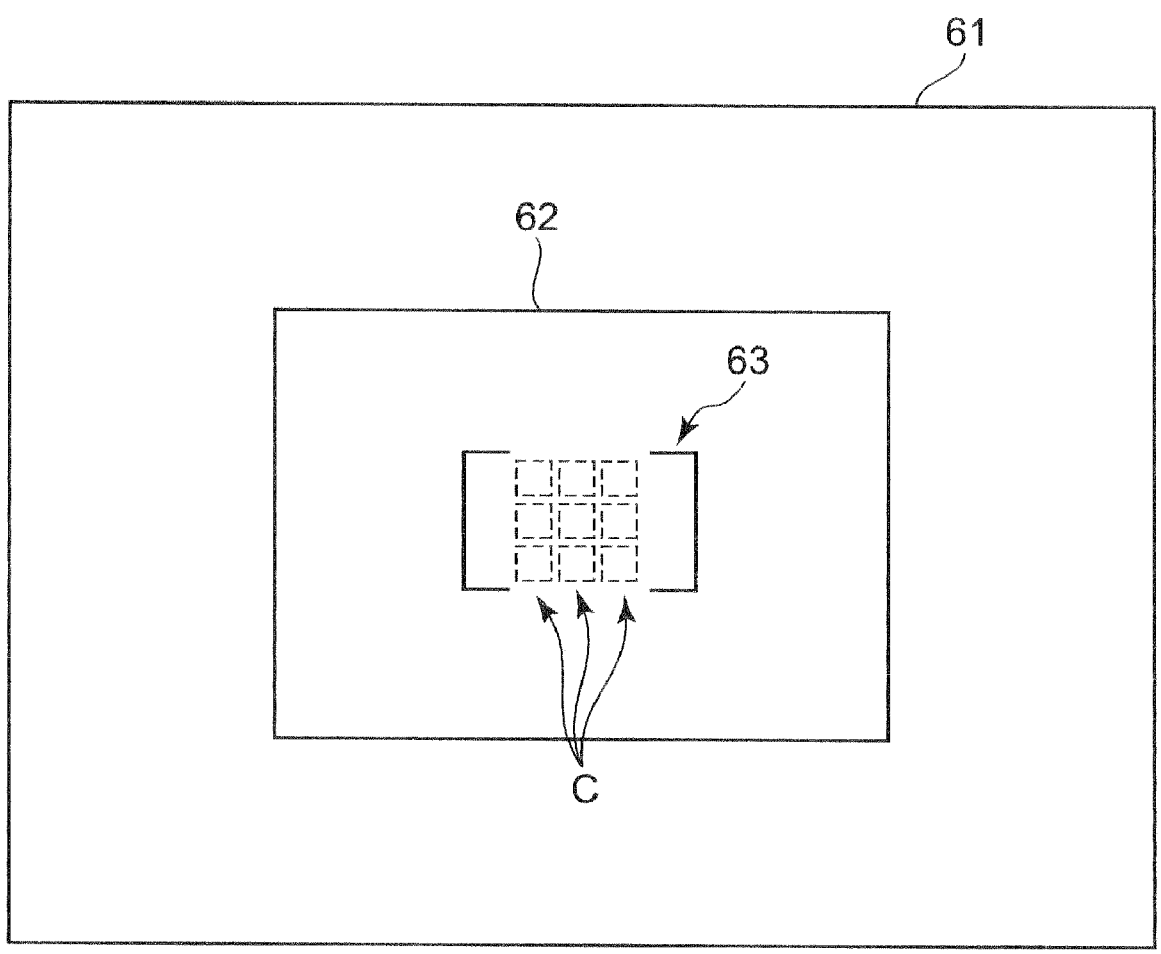
FIG. 17 is a drawing explaining a modified example of an image recording system according to the embodiment.

Moreover, the present invention is not limited to the above described embodiment, but any modifications, improvements, and the like within a range of achieving the objective of the present invention are included in the present invention. For example, in the present embodiment, one tracking object region C has been generated in the center of the focus area 63, and learning processing has been performed on this one tracking object region C, but need not be limited to this. That is to say, as shown in FIG. 17, it is also suitable to generate nine tracking object regions C in the center portion of a focus area 63, to perform learning processing for these nine tracking object regions C, and to perform image recording processing for a tracking object region for which the variance V is below a threshold value and has become a minimum, from among these nine tracking object regions C.

Furthermore, in the present embodiment, a method of probabilistically selecting according to weight has been adopted, but is not limited to this, and adopting a method of using a predetermined threshold TH3, and removing search points P for which a weight Pw is less than or equal to TH3, is acceptable. Alternatively, these probabilistic resampling and threshold resampling may be used in combination with each other as well.

What is claimed is:

1. An image recording method for sequentially obtaining consecutive images, and recording one image from among the images, comprising:
   an initialization step comprising:
      a step of setting a specified region and a tracking range surrounding the specified region within an image,
      a step of storing a characteristic value of the specified region within the image, and
      a step of generating a predetermined number of search points in the specified region of the image,
   a filtering step comprising:
      a step of updating coordinates of a plurality of search points by using random numbers,
      a step of comparing the characteristic value of the specified region with a characteristic value of each of the search points in an image after the updating, and assigning weights determined so as to increase in proportion to a degree of similarity between the characteristic value of the specified region and the characteristic value of the search point,
      a step of screening the search points according to the weights,
      a step of calculating a variance of the coordinates of the screened search points, and
      a step of calculating a weighted average of the coordinates of the screened search points, and
   an image recording determination step of determining, based on the variance of the coordinates of the screened search points, the weighted average of the coordinates of the screened search points, and the tracking range, whether or not to record an image, and recording the image if it is determined to be recorded.

2. An image recording method according to claim 1, wherein the step of screening the search points according to the weights includes calculating a summation of the weights of the search points, generating only a number of identifiers equal to the summation, associating the identifiers with the search points according to the weights, selecting identifiers only the predetermined number of times randomly from among the identifiers, and storing the search points corresponding to the selected identifiers.

3. A non-transitory computer-readable storage medium storing therein a program that is executable by a computer to carry out the image recording method according to claim 2.

4. An image recording method according to claim 1, wherein the step of screening the search points according to the weights includes eliminating search points for which the weight is less than or equal to a predetermined threshold.

5. A non-transitory computer-readable storage medium storing therein a program that is executable by a computer to carry out the image recording method according to claim 4.

6. An image recording method according to claim 1, further comprising:
   a learning step of executing the initialization step and the filtering step on a first image, and subsequently, repeating the filtering step for each of the images from the $2^{nd}$ to the $k^{th}$ (k being a natural number), and
   an image recording step of, for images that are the $(k+1)^{st}$ or later, repeating the filtering step and the image recording determination step.

7. An image recording method according to claim 6, wherein, after executing the learning step, until executing the image recording step, the specified region and the tracking range are tracked and moved by repeating the filtering step.

8. A non-transitory computer-readable storage medium storing therein a program that is executable by a computer to carry out the image recording method according to claim 7.

9. An image recording method according to claim 6, wherein, in the step of calculating a weighted average of the coordinates of the screened search points in the learning step, in a case in which the weighted average of the coordinates of the screened search points is positioned outside of the tracking range, an error is output.

10. A non-transitory computer-readable storage medium storing therein a program that is executable by a computer to carry out the image recording method according to claim 9.

11. An image recording method according to claim 6, wherein, in the step of calculating a variance of the coordinates of the screened search points in the learning step, in a case in which the variance is greater than or equal to a predetermined threshold, an error is output.

12. A non-transitory computer-readable storage medium storing therein a program that is executable by a computer to carry out the image recording method according to claim 11.

13. An image recording method according to claim 6, wherein, in the step of calculating a variance of the coordinates of the screened search points in the learning step, in a case in which an amount of variation of the variance from a previous variance is large, an error is output.

14. A non-transitory computer-readable storage medium storing therein a program that is executable by a computer to carry out the image recording method according to claim 13.

15. An image recording method according to claim 6, wherein, in the step of calculating a weighted average of the coordinates of the screened search points in the image recording step, in a case in which the weighted average of the coordinates of the screened search points is positioned outside of the tracking range, the image is recorded.

16. An image recording method according to claim 6, wherein, in the step of calculating a variance of the coordinates of the screened search points in the image recording step, in a case in which the variance is greater than or equal to a predetermined threshold, the image is recorded.

17. An image recording method according to claim 6, wherein, in the step of calculating a variance of the coordinates of the screened search points in the image recording step, in a case in which an amount of a variation of the variance from a previous variance is large, the image is recorded.

18. A non-transitory computer-readable storage medium storing therein a program that is executable by a computer to carry out the image recording method according to claim 6.

19. A non-transitory computer-readable storage medium storing therein a program that is executable by a computer to carry out the image recording method according to claim 1.

20. An image recording device for sequentially obtaining consecutive images, and recording one image from among the images, comprising:
   initialization means for setting a specified region and a tracking range surrounding the specified region within an image, storing a characteristic value of the specified region within the image, and generating a predetermined number of search points in the specified region of the image, filtering means for updating coordinates of a plurality of search points by using random numbers, comparing the characteristic value of the specified region with a characteristic value of each of the search points in an image after the updating, assigning weights determined so as to increase in proportion to a degree of similarity between the characteristic value of the specified region and the characteristic value of the search point, screening the search points according to the weights, calculating a variance of the coordinates of the screened search points, and calculating a weighted average of the coordinates of the screened search points, and image recording determination means for, based on the variance of the coordinates of the screened search points, the weighted average of the coordinates of the screened search points, and the tracking range, determining whether or not to record an image, and recording the image if it is determined to be recorded.

\* \* \* \* \*